Patented Jan. 28, 1936

2,029,100

UNITED STATES PATENT OFFICE 2,029,100

TREATMENT OF HYDROCARBON OILS

Aristid V. Grosse, Chicago, Ill., assignor to Universal Oil Products Company, Chicago, Ill., a corporation of South Dakota No Drawing. Application October 5, 1931, Serial No. 567,137

5 Claims. (Cl. 196—24)

This invention relates to the treatment of hydrocarbon oils and refers more particularly to the treatment of petroleum oils, including crude oils and the various distillate derivatives obtainable therefrom. The invention has specific application to the treatment of distillate oils containing relatively high percentages of sulfur and especially adapted to the treatment of cracked hydrocarbon distillates of this character.

In one specific embodiment the invention comprises the use of thio derivatives of metals of the sixth group of the periodic system, comprising, e. g. thio-molybdates and thio-tungstates as catalytic materials in various treating and conversion reactions upon hydrocarbon oils, particularly in reactions aimed at substantial reduction in sulfur content.

Such catalysts have been found to be particularly advantageous when oils are treated in heated condition with hydrogen or other hydrogenating gases for reduction in sulfur content, as well as for refining generally, such as for gum reduction, color removal and to improve the odor and stability of the product.

Besides hydrogen, other types of hydrocarbon gases containing hydrogen, either free or combined, may be employed in desulfurizing reactions, examples of such gases being natural gas, still gases, gases from cracking processes and particular hydrocarbons such as methane, ethane, propane and homologues in the paraffin series, and ethylene, propylene, etcetera, in the olefin series.

Catalysts of the types mentioned are also suitable for use in the treatment of hydrocarbon oils with other gases.

The thio-molybdates representing one broad class of catalysts whose use is contemplated in the present invention may be considered generally as molybdates in which the oxygen in the acid radical is partially or completely replaced by sulfur. Such compounds may be represented by the formulas $R_2'MoS_4$, $R_2'Mo_2S_7$ and $R_2'Mo_3S_{10}$ when the oxygen is completely replaced by the sulfur and by generally similar formulas in which only part of the oxygen has been thus replaced, R' representing any monovalent metal. By proper balancing of basic and acid radicals R may represent a metal of any valence.

The soluble thio-molybdates are prepared by the action of hydrogen sulfide on solutions of molybdates or by the action of soluble sulfides on molybdenum trisulfide. Insoluble thio-molybdates are formed by adding a solution of an alkali or alkaline earth thio-molybdate to a solution of a metal salt, or vice versa.

The thio-molybdates of the alkali metals sodium, potassium, lithium and caesium are uniformly crystalline substances containing varying numbers of molecules of water of crystallization. These salts are also quite easily prepared by heating molybdenum sulfides, the carbonates of the alkali metals, sulfur and charcoal. In the case of the sodium salt a thiodimolybdate with the formula $Na_2Mo_2S_7.nH_2O$ is known but not the trithiomolybdate.

Thiomolybdates of the following metals are also known: Copper, silver, gold, barium, strontium, calcium, magnesium, beryllium, zinc, cadmium, mercury (both mercurous and mercuric), tin (both stannous and stannic), lead, chromium, manganese, iron (both ferrous and ferric), cobalt, nickel and platinum. The majority of the compounds of the metals enumerated are readily prepared by precipitation methods either alone or in admixture with relatively inert spacing or carrying materials.

The thio-molybdates described in the preceding process may be considered as salts of the hypothetical molybdic acids formed by the union of one, two or three molecules of molybdenum trisulfide, $MoS_3$ with one molecule of hydrogen sulfide. When the tetrasulfide, $MoS_4$ combines with one molecule of hydrogen sulfide the acid permonothiomolybdic acid is produced with the formula $H_2MoO_5$, this acid furnishing the base material for a further series of salts corresponding to those of the thiomolybdic acids. For example, besides the salts of the alkali metals this acid of the higher sulfide may be used to form salts with the following metals: Copper, silver, gold, barium, calcium, magnesium, zinc, cadmium, mercury (both mercurous and mercuric), tin (both stannous and stannic), lead, chromium, manganese, iron (both ferrous and ferric), cobalt, nickel and platinum.

A series of salts of lesser importance are the perdithiomolybdates, corresponding to the general formula $HMoS_6$, these salts being formed by the use of metal polysulfides mixed with the normal sulphomolybdates.

As already intimated, several series of oxysulphomolybdates are included within the scope of the invention, these salts being those of molybdic acids in which the oxygen is only partly replaced by sulfur, such an acid being, for example, dioxydisulfomolybdic acid and being prepared by treating concentrated solutions of normal molybdates with metal sulfides at low temperatures. Similarly, salts may be used of the acid $H_2MoO_3S$, these being prepared by treating trimolybdates with freshly prepared metal hydro-sulfides at ordinary temperatures. Still another acid which may furnish salts utilizable according to the process of the present invention is the acid $H_2Mo_2O_4S_3$, in which either one or two atoms of hydrogen may be replaced by metals.

The thiotungstates are in general analogous to the thiomolybdates, in fact, corresponding salts are isomorphous, so that the invention possesses the advantage of using particular mixtures containing salts of both the molybdenum and tungsten series for particular purposes. Thus, the normal thio or sulpho tungstates have the general formula $R_2'WS_4$ and are prepared by the same general steps used in preparing the analogous sulthiomolybdates. Thus, they may be prepared by dissolving tungsten trisulfide ($WS_3$) in metal hydrosulfides, by the prolonged action of hydrogen sulfide on normal tungstates and by double decomposition reactions. Thiotungstates of the following metals may be prepared and utilized: Copper, silver, gold, strontium, barium, magnesium, zinc, cadmium, mercury (both mercurous and mercuric), cerium (the cerous salts), tin (both stannous and stannic), lead, manganese, iron (both ferrous and ferric), cobalt, nickel and platinum.

Similarly, also to the series of thiomolybdic acids corresponding series of oxythio tungstates may be utilized, particularly those of the alkali and alkaline earth metals.

It will be readily appreciated from the above enumeration that a large number of single or mixed catalysts may be prepared for use according to the process of the invention, each being selected for maximum efficiency in any particular case.

In the operation of the process of the invention the hydrocarbons to be treated are passed over the catalyst or in contact therewith while in admixture with hydrogen or other treating agents. In some cases the treating gas may not be required, as in some instances of direct conversion or cracking reactions. The process may be operated in conjunction and concurrently with a cracking process or distillation operation generally, the hydrocarbon vapors arising therefrom being treated as described.

The catalytic agent may be used as such or may be distributed over carriers either of an inert or active type. As examples of inert carriers may be mentioned pumice, glass beads, raschig rings or other inert fillers. As examples of active carriers may be mentioned charcoal, silica gel, fuller's earth, clays and the like.

As a specific example of the results obtained by the operation of the process, the following may be cited: A cracked hydrocarbon oil containing approximately 0.6% sulfur in heated vaporous condition was treated with approximately 5% by weight of hydrogen while in contact with the catalyst comprising cobalt tetra-thio-molybdate. The sulfur content of the oil was reduced to approximately 0.06%. The temperature of treatment was approximately 500° F. The initial hydrogen pressure was approximately 150 pounds per square inch.

When the above experiment was repeated at atmospheric pressure and approximately 750° F., the sulfur content was reduced to approximately 0.3%. The same catalyst was employed approximately five times with approximately the same results.

In another example, the catalyst was prepared by treating activated charcoal with ammonium tetra-thio-molybdate and subsequently treating the thus treated charcoal with cobaltous sulfate, thus precipitating cobalt-tetra-thio-molybdate on the active surfaces. The cracked distillate treated at approximately 500° F. and initial hydrogen pressure of 150 pounds per square inch, employing approximately 4% of hydrogen, was reduced in sulfur content to approximately 0.04%. The color and gum content of the treated distillate was satisfactory for marketing either as such or by some subsequent light treatment.

The pressures and temperatures employed may vary over a wide range, depending upon the catalyst used. At superatmospheric pressures the temperatures of treatment may be lowered somewhat. Pressures varying from atmospheric to relatively high superatmospheric and temperatures varying from approximately 400° F. to 1000° F., for the treatment of hydrocarbon vapors, and higher temperatures may be employed for the treatment of gases, for example 1000–1500° F.

I claim as my invention:

1. In the refining of sulphur-containing hydrocarbon oil, the step which comprises treating the oil with hydrogen in the presence of a preformed thio compound selected from the group consisting of the relatively stable thio-molybdates and thio-tungstates under conditions such as to react the hydrogen with sulphur compounds contained in the oil and in the absence of hydrogen sulphide other than that evolved by said reaction and from the oil.

2. In the refining of sulphur-containing hydrocarbon oil, the step which comprises treating the oil with hydrogen in the presence of a preformed relatively stable thio-molybdate under conditions such as to react the hydrogen with sulphur compounds contained in the oil and in the absence of hydrogen sulphide other than that evolved by said reaction and from the oil.

3. In the refining of sulphur-containing hydrocarbon oil, the step which comprises treating the oil with hydrogen in the presence of a preformed relatively stable thio-tungstate under conditions such as to react the hydrogen with sulphur compounds contained in the oil and in the absence of hydrogen sulphide other than that evolved by said reaction and from the oil.

4. In the refining of sulphur-containing hydrocarbon oil, the step which comprises treating the oil with hydrogen in the presence of a preformed cobalt thio-molybdate under conditions such as to react the hydrogen with sulphur compounds contained in the oil and in the absence of hydrogen sulphide other than that evolved by said reaction and from the oil.

5. In the refining of sulphur-containing hydrocarbon oil, the step which comprises treating the oil with hydrogen in the presence of preformed cobalt tetra-thio-molybdate under conditions such as to react the hydrogen with sulphur compounds contained in the oil and in the absence of hydrogen sulphide other than that evolved by said reaction and from the oil.

ARISTID V. GROSSE.